United States Patent [19]

Horton

[11] Patent Number: 4,779,477
[45] Date of Patent: Oct. 25, 1988

[54] SINGLE HANDLE TRANSMISSION CONTROL APPARATUS

[75] Inventor: Lee A. Horton, Mundelein, Ill.

[73] Assignee: Dresser Industries, Inc., Dallas, Tex.

[21] Appl. No.: 99,077

[22] Filed: Sep. 21, 1987

[51] Int. Cl.$^4$ .............................................. G05G 9/12
[52] U.S. Cl. ............................ 74/473 R; 74/473 SW; 74/475; 74/487; 74/506; 74/501.6
[58] Field of Search .............. 74/104, 473 R, 473 SW, 74/475, 487, 501 R, 501 E, 506, 879

[56] References Cited

U.S. PATENT DOCUMENTS

| | | | |
|---|---|---|---|
| 757,815 | 4/1904 | Krebs | 74/487 |
| 1,819,688 | 8/1931 | Moore | 74/879 |
| 2,640,374 | 6/1953 | Willis | 74/745 |
| 2,664,979 | 1/1954 | Parent | 74/487 X |
| 2,861,465 | 11/1958 | Winkle et al. | 74/484 X |
| 3,180,305 | 4/1965 | Rempel | 74/879 X |
| 3,211,019 | 10/1965 | Roach et al. | 74/501 E |
| 3,795,157 | 3/1974 | Campbell et al. | 74/789 |
| 3,808,907 | 5/1974 | Yamaguchi | 74/473 RX |
| 3,975,970 | 8/1976 | Elfes et al. | 74/473 R |
| 4,152,950 | 5/1979 | Langford | 74/471 XY |
| 4,270,403 | 6/1981 | West | 74/473 R |
| 4,321,980 | 3/1982 | Nissen | 180/333 |
| 4,485,689 | 12/1984 | Cambria | 74/477 |
| 4,541,497 | 9/1985 | Riediger | 180/6.48 |
| 4,635,497 | 1/1987 | Siewert et al. | 74/473 SW |

FOREIGN PATENT DOCUMENTS 1630224 9/1978 Fed. Rep. of Germany ........ 74/473 SW

*Primary Examiner*—Allan D. Herrmann
*Attorney, Agent, or Firm*—Roy L. Van Winkle

[57] ABSTRACT

A single handle control for vehicle transmission that includes a body pivotal about a longitudinal axis to move a cable controlling the forward and reverse clutches of the transmission, a control handle rotatable about an axis perpendicular to the longitudinal axis that reels and unreels a tape to move a second control cable which controls the selection of the speed range clutch in the transmission, and a neutral lock that prevents pivoting of said body to actuate the forward and reverse clutches.

11 Claims, 2 Drawing Sheets

SINGLE HANDLE TRANSMISSION CONTROL APPARATUS

BACKGROUND OF THE INVENTION

This invention relates generally to controls for vehicular transmissions. More particularly, but not by way of limitation, this invention relates to transmission control apparatus that utilizes a single handle to control both forward and reverse directions and to control the speed range of the transmission.

One type of single handle vehicle control system is illustrated in U.S. Pat. No. 3,180,305 issued Apr. 27, 1965 to John Gower-Remple. The system described therein is utilized to control braking, steering, throttling, power and speed of the vehicle. While the system disclosed may function satisfactorily for the use intended, it is a system involving a very complex arrangement of control rods, linkages, etc. because of the many functions controlled.

Another control system is illustrated in U.S. Pat. No. 3,795,157 issued Mar. 5, 1974 to Trevor G. Campbell et al. The system described therein aso provides a single handle control for controlling gear selection and engine speed. Again, the system disclosed is one involving various arrangements of toggles and control rods and is different from the system described herein.

The object of this invention is to provide a single lever control that controls both the direction and the speed range of the transmission through simple yet effective apparatus that is relatively easy to operate, manufacture, and maintain.

SUMMARY OF THE INVENTION

This invention provides improved transmission control apparatus for a vehicle wherein the transmission includes a forward direction clutch, reverse direction cluth, clutch for each speed range and has a neutral position wherein neither the forward nor reverse clutch is actuated, and valves for controlling actuating fluid flow to the clutches. The improvement comprises a hollow elongated control body pivotally supported on the vehicle, cam located in the body and pivotal therewith, a cam follower movable axially in the body, a directional control cable attached to and movable with the cam follower, a transversely extending rotatable range control handle projecting from the body for pivoting the body whereby the cam follower and direction cable moves axially relative to the body to control the forward direction clutch, reverse direction clutch, or neutral, and a speed range control cable extending through the body and operably connected to the range control valve for selecting one of the range clutches upon pivoting of the range control handle relative to the body.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
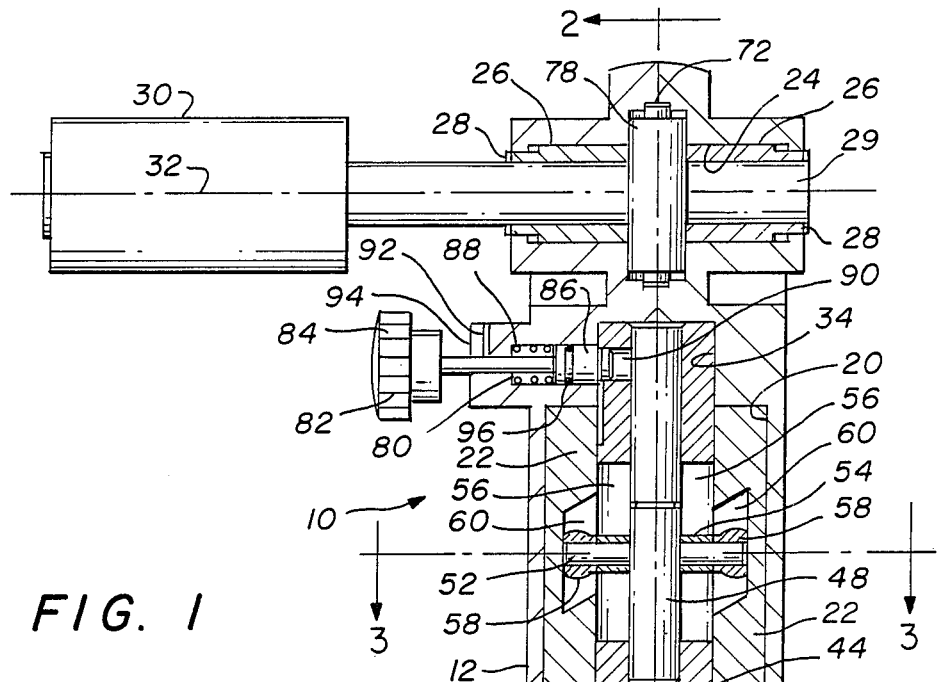
FIG. 1 is a vertical, cross-sectional view of a transmission control apparatus that is manufactured in accordance with the invention.

Referring to the drawing and to FIG. 1 in particular, shown therein and generally designated by the reference character 10 is a transmission control apparatus that is constructed in accordance with the invention. The apparatus 10 includes body means designated by the reference character 12 which is preferably formed in two halves 14 and 16 that are joined by threaded fasteners or the like (not shown). The body means 12 is hollow and has a bore 18 extending from the lower end thereof upwardly with an enlarged portion 20 for receiving a pair of cam members 22.

The body means 12 also includes a transversely extending opening 24 that is sized to receive bearings 26 and seals 28. The bearings 24 are provided to journal a shaft 29 of an operating handle 30 for rotation about a transverse axis 32.

It will be noted that the bore 18 is sized to receive a cam follower guide member 34 which has a lower end 36 fixed, as illustrated at 38, so that the cam follower guide member 36 is restrained against pivotal movement about a longitudinal axis 40 of the body means 12. The body means 12 is arranged so that it can be pivoted by means of the handle 30 about the axis 40.

As illustrated, the cam follower guide member 36 is also hollow having a cable locknut 42 attached thereto with a cable 44 extending upwardly through the member 34. The upper end of the cable 44 is attached to a guide member 48 and the lower end of the cable 44 is attached to the forward/reverse/neutral control valve 50 (see FIG. 4).

A cam follower shaft 52 extends transversely through the cable guide member 48. The shaft carries a first pair of bushings 54 that are sized to slide within slots 56 formed in the cam follower guide member 36. A second set of rollers 58 are sized to fit within helical cam grooves 60 that are formed in each of the cam members 22.

Figure 2:
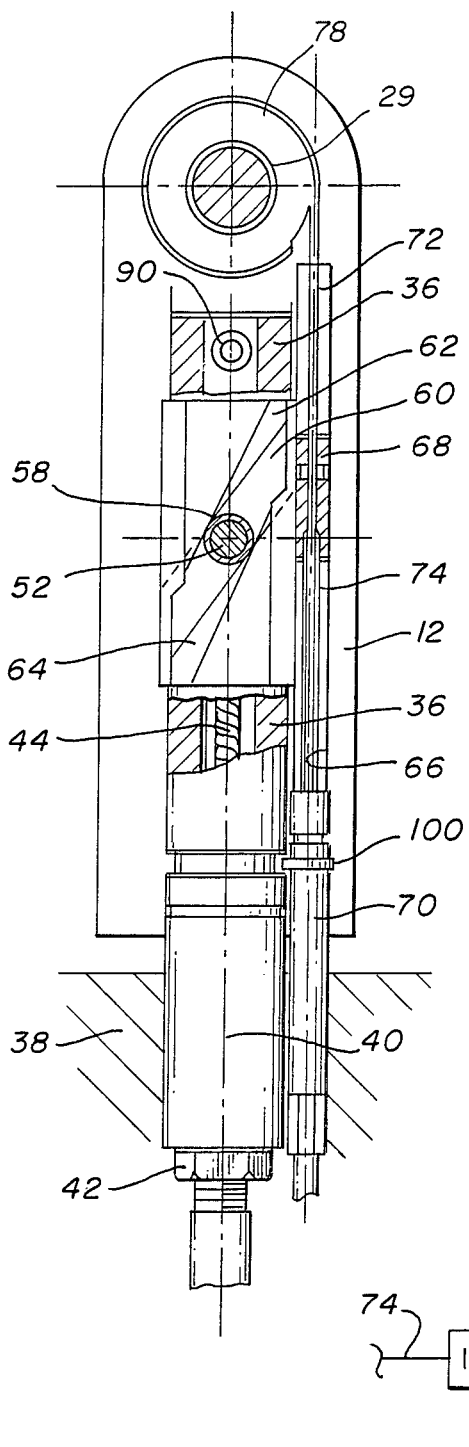
FIG. 2 is a vertical, cross-sectional view of the control apparatus of FIG. 1 taken generally along the line 2—2 of FIG. 1.

The helical configuration of the cam groove 60 can be seen more clearly in FIG. 2. Also, it will be noted in FIG. 2 that the grooves 60 form surfaces 62 and 64 adjacent to the slots 56 and through which the cam follower rollers 58 operate as will be described. A transverse cross-sectional view of the arrangement just described is shown in FIG. 3.

Figure 3:
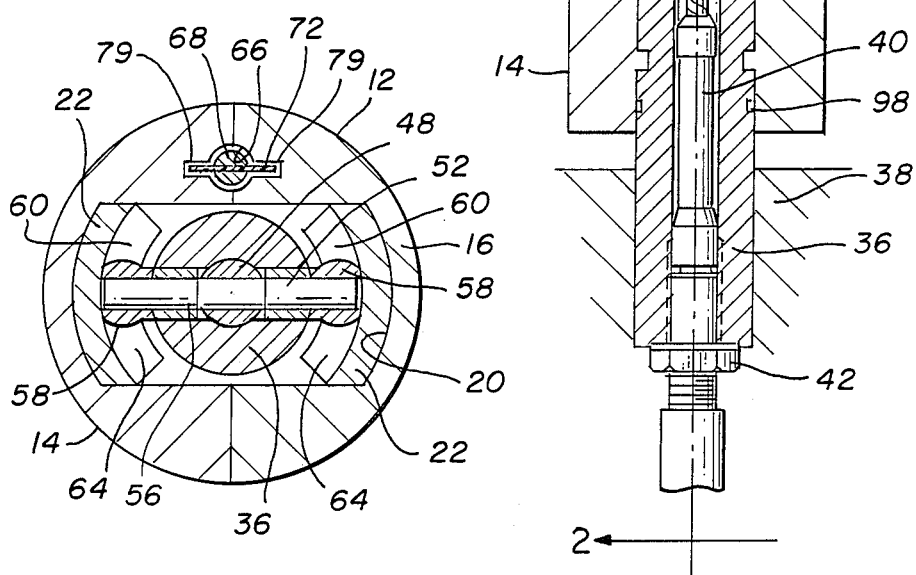
FIG. 3 is a transverse, cross-sectional view of the control apparatus taken generally along the line 3—3 of FIG. 1.

A second longitudinal passageway 66 is formed in the body means 12 as shown in FIGS. 2 and 3. The passageway 66 is sized to accommodate a tape guide member 68 and to receive, at its lower end, a cable fitting 70. The tape guide 68 is arranged so that it is attached to one end of a range control tape 72 and at its lower end to the upper end a range control cable 74 which extends through the cable fitting 70.

Figure 4:
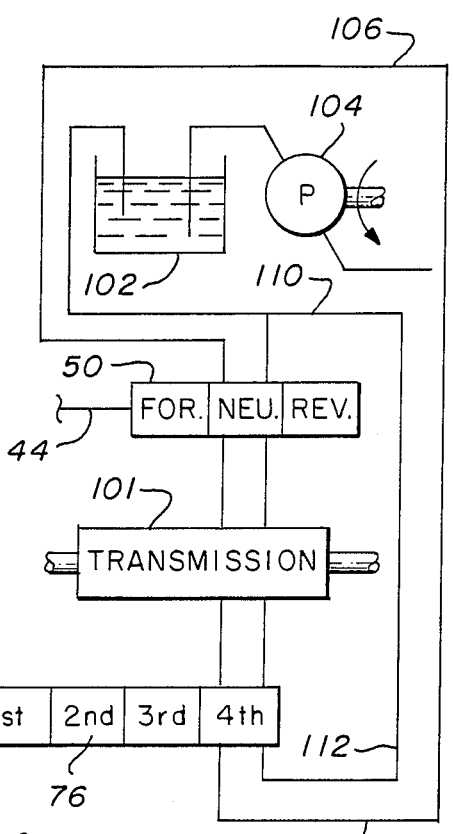
FIG. 4 is a schematic illustrating a vehicle transmission connected with the valves for controlling the transmission clutches and the hydraulic system associated therewith.

The lower end of the cable 74 is, as shown in FIG. 4, attached to a speed range control valve 76 which is also connected to the transmission.

The flexible tape 72 is wrapped about an enlarged portion 78 of the handle 30 so that rotation of the handle 30 about the transverse axis 32 causes the tape 72 to be wound upon or unwound from the enlarged portion 78 pushing and pulling the tape guide 68 in the passageway 66 to move the cable 74.

The change from rotation to linear motion of the flexible tape 72 permits pushing and pulling of cable 74 because the edges of the tape 72 extend into and are guided by tape guide grooves 79. The grooves 79 form part of and extend outwardly from the passageway 66 as may be clearly seen in FIG. 3.

As previously mentioned, the handle 30 is also utilized to rotate the body means 12 about the longitudinal axis 40 and relative to the cam follower guide member 34. To prevent such relative rotation, and in fact, to hold the transmission in the neutral position, a short transverse passageway 80 extends into the body means 12 and receives a neutral lock plunger or shaft 82 which has its outermost end 84 located outside the body means 12 and its inner end 86 located interiorly thereof. A spring 88 is located in such a manner as to continually urge the neutral lock shaft 82 into engagement with the cam follower guide member 34. It will be observed in FIGS. 1 and 2 that a small hole or recess 90 has been formed in the cam follower guide member 34 to receive the innermost end 86 of the neutral lock shaft 82.

A small pin 92 extends from the shaft 82 and is located, when the lock shaft 82 is in the locking position, in a recess 94 formed in the body means 12. The neutral lock shaft 82 can be disengaged from the member 34 by pulling outwardly on the shaft 82 moving the pin out of the recess 94 and then rotating the shaft 82 so that the pin 92 rides on the outer end of the body means 12. This action locks the lock shaft 82 outwardly against the force of the spring 88.

In addition to the seals 28 previously mentioned, it should be pointed out that a seal 96 encircles the shaft 82, a seal 98 encircles the cam follower guide member 36, and a seal 100 encircles the cable fitting 70. The seals 28, 96, 98, and 100 function to seal the interior of the body means 12 on the exterior, thus excluding deleterious materials from the interior of the body means and assuring that the control apparatus 10 will operate properly even in adverse environments.

FIG. 4, which has been mentioned hereinbefore, is a schematic diagram illustrating the cable connections between the control valves 50 and 76 and the control apparatus 10. Also illustrated is a schematic of the hydraulic system that provides the fluid to the transmission 101 to operate the clutches (not shown) selected by the control apparatus 10 through the valves 50 and 76. The hydraulic system includes a reservoir 102, is connected to a hydraulic pump 104. The pump 104 is connected by conduits 106 and 108 to valves 50 and 76, respectively. The valves 50 and 76 are connected by conduits 110 and 112, respectively, with the reservoir 102 for returning fluid to the reservoir. The valves 50 and 76 are also connected by hydraulic conduits (unnumbered) as appropriate to provide the desired fluid flow to and from the transmission 101 from the control valves 50 and 76.

Operation of the Preferred Embodiment

To operate the transmission 101 through the control apparatus 10, it is necessary that the pump 104 be operating to deliver fluid from the reservoir 102 into the valves 50 and 76. As illustrated in FIG. 1, the control apparatus 10 is in the neutral position, that is, the neutral lock shaft 82 is positioned with the end 86 thereof located in the recess 90 of the cam follower guide 34. In this position, the neutral lock shaft 82 prevents relative rotation between the body means 12 and the cam follower guide member 34. When in this position, it does not matter which range is selected since the forward and reverse clutches of the transmission 101 are not actuated and no movement of the vehicle will take place.

When it is desired to place the transmission 101 in either forward or reverse, the neutral lock shaft 82 is grasped by the operator and pulled outwardly against the force of the spring 88. This removes the end 86 of the shaft 82 from the recess 90 and the control handle 30 can be rotated about the axis 40 in the appropriate direction to actuate either the forward or reverse portions of the valve 50.

Upon pivoting of the body means 12 about the axis 40, the cam members 22 are also pivoted therewith. Thus, the helical cam surfaces 62 and 64 are in engagement with the cam follower rollers 58 52 causing the cam follower shaft 52 to move along the axis 40 in accordance with the direction of pivoting of the body means 12. The cam follower shaft 52 is limited to vertical movement by the slots 56 formed in the cam follower guide member 34. Thus, rotation of the control handle 30 about the axis 40 results in movement of the control cable 44 which is connected with the valve 50 along the axis 40 to appropriately position the valve 50.

To control the range or the speed of the transmission 101, the control handle 30 is rotated about the transverse axis 32 so that the tape 72 is either coiled about the enlarged portion 78 or uncoiled therefrom, depending on the direction of rotation of the control handle 30. Movement of the tape 72 pushes or pulls the tape guide member 68 which is attached to the range control cable 74. The tape guide grooves 79, in the body means 12, prevent the tape from buckling when pushing on tape guide member 68. The control cable 74 has its other end attached to the valve 76 and appropriately positions the valve 76 to actuate the desired clutch in the transmission 101.

Although not shown, it will be understood that appropriate indices or detents will be provided adjacent to the control apparatus 10 so that the vehicle operator will know in which operating position the valves 50 and 76 are located.

From the foregoing, it will be appreciated that the control apparatus 10 provides relatively simple apparatus that can be easily manufactured and maintained, one that provides both speed range and forward and reverse controls through a single handle, and one that provides a positive neutral lock that prevents inadvertent operation of the vehicle.

It will be understood that the single embodiment described in detail hereinbefore is presented by way of example only and that many changes and modifications can be made thereto without departing from the spirit or scope of the invention.

What is claimed is:

1. Improved transmission control apparatus for a vehicle wherein the transmission includes a forward direction clutch, a reverse direction clutch, a clutch for each speed range and has a neutral position wherein neither the forward nor reverse clutch is actuated, and valve means for controlling actuating fluid flow to the clutches, the improvement comprising:

hollow, elongated, control body means pivotally supported on the vehicle;

cam means located in said body means and pivotal therewith, said cam means including cam follower means moveable axially in said body means;

directional control cable means attached to and moveable with said cam follower means;

transversely extending, rotatable range control means projecting from said body means for pivoting said body means whereby said cam follower means and direction cable means move axially relative to said body means to one of said forward direction clutch, reverse direction clutch, or neutral; and, speed range control cable means extending through said body means and operably connected to said range control means for selecting one of said range clutches upon pivoting of said range control means relative to the body means.

2. The apparatus of claim 1 wherein said cam means includes at least one generally helical cam surface engaging said cam follower means for changing pivotal movement of said cam means into the axial movement of said cam follower means.

3. The apparatus of claim 1 and also including releasable neutral lock means located in said body means for selectively preventing and permitting pivotal movement of said body means.

4. The apparatus of claim 1 wherein said cam means also includes a cam follower guide member restrained against pivotal movement and having an axially extending slot therein receiving said cam follower means preventing pivotal movement of said cam follower means.

5. The apparatus of claim 1 wherein said speed range control cable means includes:

a control cable extending through said body means; and, a control tape having one end attached to said range control means and another end attached to said control cable whereby rotation of said range control means reels and unreels said tape pushing and pulling, respectively, said control cable axially relative to said body means to a selected speed range.

6. The apparatus of claim 4 wherein said neutral lock means engages said cam follower guide means to prevent pivotal movement of said body means relative to said cam follower guide means.

7. The apparatus of claim 6 wherein said speed range control cable means includes:

a control cable extending through said body means; and, a control tape having one end attached to said range control means and another end attached to said control cable whereby rotation of said range control means reels and unreels said tape pushing and pulling, respectively, said control cable relative to said body means to a selected speed range position.

8. The apparatus of claim 7 wherein said cam follower means includes a transversely extending shaft connected to said directional control cable means, said shaft extending through said axially extending slot in said cam follower guide member and into mating engagement with said helical cam surface.

9. The apparatus of claim 8 wherein:

said neutral lock means includes a lock member having a first end located outside said body means and a second end inside said body means, resilient means biasing said lock means toward said cam follower guide member, and a member selectively restraining said lock means from engaging said cam follower guide means; and, said cam follower guide means has a recess therein receiving said second end of said lock means to prevent pivotal movement of said body means relative to said cam follower guide member retaining said control transmission in the neutral position.

10. The apparatus of claim 5 wherein said body means includes:

a passageway for receiving said control cable; and, slots extending radially from said passageway for receiving edges of said tape to prevent buckling of said tape when pushing on said cable.

11. The apparatus of claim 7 wherein said body means includes:

a passageway for receiving said control cable; and, slots extending radially from said passageway for receiving edges of said tape to prevent buckling of said tape when pushing on said cable.

* * * * *